United States Patent [19]

Socha

[11] 4,373,959
[45] Feb. 15, 1983

[54] READILY DISSOLVABLE POLYSACCHARIDE COMPOSITIONS

[75] Inventor: Gregory E. Socha, Midland, Mich.

[73] Assignee: The Dow Chemical Company, Midland, Mich.

[21] Appl. No.: 276,437

[22] Filed: Jun. 22, 1981

[51] Int. Cl.³ ................................................. C08L 1/08
[52] U.S. Cl. ................................. 106/194; 106/193 R; 106/197 R; 106/209
[58] Field of Search ............... 106/193, 197, 205, 209, 106/194; 536/85, 88

[56] References Cited

U.S. PATENT DOCUMENTS

| | | | |
|---|---|---|---|
| 2,445,226 | 7/1948 | Landers | 106/180 |
| 2,647,064 | 7/1953 | Anderson et al. | 106/179 |
| 2,698,254 | 12/1954 | Spurlin | 106/193 |
| 2,720,464 | 10/1955 | Anderson et al. | 106/197 |
| 2,879,268 | 3/1959 | Jullander | 536/84 |
| 3,014,808 | 12/1961 | Nyberg | 106/197 R |
| 3,072,635 | 1/1963 | Menkart et al. | 536/84 |
| 3,341,516 | 9/1967 | Savage | 536/84 |
| 3,356,519 | 12/1967 | Chambers et al. | 106/187 |
| 3,372,156 | 3/1968 | Schwarzer | 536/84 |
| 3,376,285 | 4/1968 | Callahan | 536/84 |
| 3,455,714 | 7/1969 | Bishop et al. | 106/197 R |
| 3,461,115 | 8/1969 | Schwarzer | 536/84 |
| 3,489,719 | 1/1970 | Savage et al. | 200/73 |
| 3,944,428 | 3/1976 | Schoenberg | 106/213 |
| 3,997,508 | 12/1976 | Ziche | 525/61 |
| 4,321,367 | 3/1982 | Cheng et al. | 536/88 |

Primary Examiner—Theodore Morris

[57] ABSTRACT

A mixture of (1) a cross-linked, aqueous soluble polysaccharide or derivative thereof and (2) an aqueous soluble polysaccharide or derivative having essentially no cross-linking readily dissolves in an aqueous liquid to form a homogeneous solution. For example, a mixture of a cellulose ether, e.g., hydroxypropyl methylcellulose, lightly cross-linked with a dialdehyde such as glyoxyl and a cellulose ether which has not been cross-linked can be added to an aqueous liquid and readily dissolved without lumping or the like to form a clear, stable solution in the absence of continuous agitation.

13 Claims, No Drawings

READILY DISSOLVABLE POLYSACCHARIDE COMPOSITIONS

BACKGROUND OF THE INVENTION

The present invention relates to polysaccharide compositions, particularly to compositions of a combination of a cross-linked polysaccharide and a polysaccharide having no cross-linking.

Aqueous soluble polysaccharides such as the natural gums, e.g., guar gum, and the aqueous soluble derivatives of a polysaccharide such as the cellulose ethers are employed in a variety of commercial applications. In general, the aqueous soluble polysaccharides or polysaccharide derivatives are dissolved in water prior to or coincident with their use. Unfortunately, many polysaccharides, and/or derivatives thereof, e.g., cellulose ethers such as hydroxypropyl methylcellulose are not readily dispersible in aqueous liquids due to the fact that the polysaccharides or derivatives are not easily wetted by cold water, thereby tending to agglomerate and form into soft lumps, balls or nodules. Thereafter, these agglomerations are extremely difficult to disperse and/or dissolve in cold water.

Heretofore, to facilitate their dispersion and subsequent dissolution, the polysaccharide or polysaccharide derivatives thereof is initially dispersed with agitation in hot water. On subsequent cooling or the addition of cold water to the resulting uniform dispersion, a solution of the polysaccharide or derivative is obtained. Unfortunately, an undesirably long time period is often required prior to complete dissolution. Moreover, since many of the other ingredients such as dyes and pigments are adversely affected by hot water, the direct formulation of aqueous compositions containing the dissolved polysaccharide or derivative is often not possible. Therefore, it is frequently necessary to prepare a separate solution of the cellulose ether and to subsequently mix the resulting solution with a solution or suspension of other ingredients to obtain the desired, final composition.

Various other means have also been proposed to reduce the difficulty of and time for dissolving cellulose ethers and other polysaccharides or polysaccharide derivatives in aqueous liquids. For example, thoroughly blending particles of an aqueous soluble cellulose ether with another dry powder such as calcium carbonate prior to the ether's addition to water assists in achieving a uniform dispersion of the cellulose ether. Unfortunately, the blended dry powder ingredients often affect the properties of the resulting composition and are not always compatible with the composition's other ingredients.

Alternatively, U.S. Pat. No. 2,647,064 discloses that particles of a cellulose ether having a surface active agent incorporated therein are more readily dissolvable in cold water. (See also, U.S. Pat. No. 2,720,464.) Unfortunately, large amounts of the surface active agent are required to prepare a readily dissolvable cellulose ether, thereby rendering the treated particles unsuitable for use in many applications.

In another method for improving the cold water dispersibility of a cellulose ether or other polysaccharide derivative, U.S. Pat. No. 2,879,268 discloses treating the cellulose ether with small amounts of a cross-linking agent such as formaldehyde or a dialdehyde such as glyoxal. The resulting, lightly cross-linked cellulose ethers can be added directly to cold water and subsequently dissolved without the formation of soft lumps or other agglomerations. In general, the addition of an ammonium or alkali metal salt of a weak protonic acid with the lightly cross-linked cellulose ethers will further improve the cold water solubility thereof by reducing the time for complete dissolution to occur. (See, for example, U.S. Pat. No. 3,357,519.) Unfortunately, in many cases, particularly in soft and/or cold water, the cross-linked cellulose ether dissolves at a sufficiently slow rate that, without continuous agitation, the cellulose ether settles to the bottom of the aqueous liquid. This settling results in slow increase in the viscosity of the aqueous liquid and yields a nonuniform solution which contains undissolved, agglomerated particles of the cellulose ether.

In view of the stated deficiencies in the prior art, it remains highly desirable to provide a composition of a polysaccharide or polysaccharide derivative which polysaccharide or derivative is readily dissolved in cold water without the formation of agglomerations, soft lumps or nodules in the absence of continuous agitation.

SUMMARY OF THE INVENTION

Accordingly, the present invention is a polysaccharide composition comprising (a) an aqueous soluble polysaccharide or polysaccharide derivative having essentially no cross-linkages and (b) an aqueous soluble polysaccharide or polysaccharide derivative being sufficiently cross-linked that it does not form lumps, nodules or other agglomerations when added to water at ambient temperatures, said uncross-linked polysaccharide or derivative and cross-linked polysaccharide or derivative being employed in amounts such that, upon the composition's subsequent dispersion and subsequent dissolution in an aqueous liquid at ambient temperatures, the uncross-linked polysaccharide or derivative does not form substantial soft lumps, nodules or other agglomerations and the viscosity of the aqueous liquid is increased at a sufficient rate that the cross-linked polysaccharide or derivative is maintained as a dispersion in the aqueous liquid without significant amounts thereof settling prior to dissolution.

Surprisingly, after initially dispersing the polysaccharide composition in an aqueous liquid, the uncross-linked polysaccharide or derivative readily dissolves at ambient temperatures without the expected formation of soft lumps, nodules or other agglomerations. In addition, the viscosity of the aqueous liquid rapidly increases, thereby maintaining a uniform dispersion in the absence of continuous agitation without settling of the cross-linked polysaccharide or derivative prior to its dissolution. Therefore, a homogeneous aqueous solution having the desired viscosity can readily be obtained in the absence of continuous agitation.

The polysaccharide compositions of the present invention are useful in a wide variety of applications including those applications wherein the polysaccharides and polysaccharide derivatives are conventionally employed. The compositions of this invention are particularly useful for thickening wall covering adhesives and other aqueous based compositions such as paints, printing inks, textile printing bases and other aqueous-based, adhesive formulations.

DETAILED DESCRIPTION OF THE PREFERRED EMBODIMENTS

The term "aqueous-soluble polysaccharide or polysaccharide derivative" is used conventionally herein and refers generally to polysaccharides (i.e., polymers comprised of monosaccharide units linked together by glycosidic bonds) or chemical modifications of polysaccharide which polysaccharides or chemical modifications thereof are soluble in one or more aqueous liquids. Hereinafter, the term "polysaccharide" shall refer to both polysaccharides and polysaccharide derivatives. By the term "aqueous-soluble" is meant that the polysaccharide is capable of being admixed with the aqueous liquid such that the resulting mixture appears as a homogeneous liquid under visual inspection with no magnification. Advantageously, in such solution individual molecules of the polysaccharide are uniformly dispersed in the aqueous liquid. Preferably, the polysaccharide forms at least about a 1, more preferably at least about a 1.6, weight percent solution in an aqueous liquid.

Representative polysaccharides soluble in an aqueous liquid include the water-soluble derivatives of cellulose including various cellulose ethers such as methylcellulose; hydroxyalkyl celluloses such as hydroxyethylcellulose, hydroxypropylcellulose and hydroxyethylhydroxypropylcellulose; hydroxyalkyl methylcelluloses such as hydroxypropyl methylcellulose and hydroxyethyl methylcellulose; hydroxyalkyl cellulose containing ionic substituents such as dialkylaminoalkyl hydroxypropylcellulose and carboxyalkyl hydroxyalkyl cellulose; water-soluble salts of cellulose hydroxycarboxylic acids such as the disodium salt of carboxymethylcellulose; natural gums such as arabic, tragacanth or karaya gum and natural gum derivatives such as hydroxypropylated guar gums; xanthan gum; modified starches such as hydroxypropyl starch; and the like. Of such polysaccharides, those preferably employed herein are the water-soluble cellulose ethers, particularly methylcellulose and methylcellulose derivatives such as hydroxypropylmethylcellulose; with hydroxypropyl methylcellulose being most preferred.

The solubility of the aforementioned polysaccharides and polysaccharide derivatives is dependent upon a variety of factors including the average degree of polymerization (average molecular weight) and, in the case of the polysaccharide derivatives, the particular substituent and the degree of substitution, i.e., the number of substituent groups per anhydroglucose unit of the polysaccharide molecule. In general, the relative solubility of the polysaccharide in an aqueous liquid increases as the molecular weight decreases. In addition, a polysaccharide derivative having a low degree of substitution may only be soluble in an alkaline aqueous liquid, whereas a polysaccharide derivative having a higher degree of substitution may be soluble in water as well as an alkaline aqueous liquid. The particular substituent and the degree of substitution which imparts the desired solubility to the polysaccharide derivatives are well-known in the art and reference is made thereto for the purposes of this invention.

In general, of the aforedescribed polysaccharides, those polysaccharides which are capable of imparting a relatively high viscosity to the aqueous liquid, thereby facilitating the maintenance of a uniform dispersion prior to complete dissolution of the cross-linked polysaccharide are advantageously employed as the uncross-linked polysaccharide in the practice of the present invention. Preferably, the uncross-linked polysaccharide is capable of forming, as a 2 weight percent solution in the aqueous liquid, an aqueous solution having a viscosity of at least about 40,000, more preferably at least about 50,000, most preferably at least about 70,000, cps wherein said viscosity is measured at 20° C. using a Ubbelohde tube viscometer sized for an efflux time of from about 60 to about 120 seconds.

Cross-linked polysaccharides and the methods for their preparation are well-known in the art and reference is made to U.S. Pat. Nos. 2,879,268; 3,072,635 and 3,376,285 (all of which are hereby incorporated by reference) as illustrative of such cross-linked polysaccharides and their preparation methods. In this invention, the cross-linkages are advantageously easily destroyed to facilitate the dissolution of the polysaccharide. Typically, the cross-linked polysaccharides are the reaction product of a polysaccharide containing reactive hydroxy groups with an aldehyde (including di- or polyaldehydes) such as formaldehyde, glyoxal, succinaldehyde and other dialdehydes (advantageously containing from about 2 to about 6 carbon atoms) such as malonaldehyde, pyruvic aldehyde and adipaldehyde. Formaldehyde and glyoxal are generally preferred with glyoxal being the most preferred cross-linking agent.

In the practice of the present invention, the cross-linked polysaccharide contains sufficient cross-linking such that, upon its admixture with aqueous liquid at ambient temperatures, i.e., temperatures from about 18° C. to about 25° C., there is no substantial formation of soft lumps, nodules or other agglomerations. Although the amounts of cross-linking agent required to impart this property to the cross-linked polysaccharide is dependent upon many factors including the cross-linking agent and the specific polysaccharide employed, in general, from about 0.1 to about 10 weight percent of the cross-linking agent, based on the weight of the polysaccharide, is employed. Preferably, from about 0.2 to about 5, more preferably from about 0.3 to about 2.5, weight percent of the cross-linking agent is used. In general, such cross-linking is most advantageously concentrated on the surface of the cellulose ether particles.

It is often advantageous to prepare the composition of the present invention using cross-linked polysaccharides having different amounts of cross-linkages. For example, in addition to the uncross-linked polysaccharide, the composition can advantageously comprise one cross-linked polysaccharide having a relatively high degree of cross-linkages, e.g., cross-linked using from about 1.2 to about 5 weight percent of a cross-linking agent based on the weight of the polysaccharide, and a lesser cross-linked polysaccharide, e.g., a cross-linked polysaccharide prepared using from about 0.1 to about 1 weight percent of a cross-linking agent. Preferably, the highly cross-linked polysaccharide will be prepared using from about 1.2 to about 2.5 weight percent of the cross-linking agent and the lesser cross-linked polysaccharide using from about 0.1 to about 0.8 weight percent of the cross-linking agent wherein said weight percents are based on the weight of the polysaccharide.

The polysaccharide and cross-linked polysaccharide are advantageously prepared in the form of an essentially dry, free-flowing particulate material such as a powder or granules. Advantageously, said particulate material has an average particle size from about 0.074 to about 2 millimeters (mm), preferably from about 0.15 to about 0.5 mm and a water content of less than about 15, preferably less than about 10, weight percent.

In the practice of the present invention, the uncross-linked polysaccharide and cross-linked polysaccharide are admixed in amounts such that, upon the dispersion, using agitation, and subsequent dissolution of the polysaccharide composition in an aqueous liquid at ambient temperatures, substantial amounts of soft lumps, nodules or other agglomerations are not formed and the viscosity of the aqueous liquid is increased at a sufficient rate such that continued agitation is not required to maintain the cross-linked polysaccharide in dispersion, i.e., significant amounts of the cross-linked polysaccharide do not settle prior to dissolution.

By the term "formation of substantial amounts of soft lumps, nodules or other agglomerations" is meant that, following dispersion, with agitation, of the polysaccharide composition in the aqueous liquid the viscosity development of the aqueous liquid (i.e., the rate at which the viscosity of the aqueous liquid increases), caused by the dissolution of the uncross-linked polysaccharide, is not substantially retarded by the formation of soft lumps, nodules or other agglomerations. In this invention, substantial retardation of viscosity development is evidenced by the settling of significant amounts of the cross-linked polysaccharide prior to its dissolution. By the term "settling of significant amounts of the cross-linked polysaccharide" is meant that following the dispersion of the polysaccharide composition in soft water (i.e., water having about 10 or less parts per million of $Mg^{++}$ and $Ca^{++}$ ions as determined by conventional techniques), the viscosity development is sufficiently retarded such that less than about 10 weight percent of the cross-linked polysaccharide settles prior to dissolution in the absence of continued agitation. Advantageously, the viscosity development of the soft water subsequent to the addition of the polysaccharide composition is sufficiently rapid such that less than about 2, preferably less than about 1, weight percent of the cross-linked polysaccharide settles prior to dissolution. Most preferably, none of the cross-linked polysaccharide settles prior to dissolution.

To obtain such desirable results upon the addition of the polysaccharide composition to soft and/or cold water, the viscosity of the aqueous liquid is increased by a measurable amount within about two minutes of the initial dispersion of the polysaccharide composition in the aqueous liquid. Preferably, the viscosity increases of the aqueous liquid within the stated time period are sufficient to prevent the settling of the uncross-linked polysaccharide. More preferably, a measurable viscosity increase is evidenced within about one minute following the initial dispersion of the polysaccharide composition in the aqueous liquid. Most preferably, there is essentially no formation of lumps, nodules or other agglomerations, thereby causing rapid dissolution of the uncross-linked polysaccharide and immediate viscosity development.

Although the amounts of the uncross-linked polysaccharide and cross-linked polysaccharide required to give the polysaccharide composition the desired properties (including the desired dissolution properties and final solution viscosities) will vary depending on a variety of factors including the specific uncross-linked polysaccharide and cross-linked polysaccharide employed. In general, the polysaccharide composition of this invention will comprise at least about 70 weight percent of the cross-linked polysaccharide and less than about 30 weight percent of the uncross-linked polysaccharide, based on the total weight of the cross-linked and uncross-linked polysaccharides. Advantageously, the polysaccharide composition will generally comprise from about 5 to about 20 weight percent of the uncross-linked polysaccharide and from about 95 to about 80 weight percent of the cross-linked polysaccharide. When greater than 20 weight percent of the uncross-linked polysaccharide is employed, substantial amounts of lumping or agglomerations are generally exhibited by the addition of the polysaccharide composition to an aqueous liquid. Alternatively, when the uncross-linked polysaccharide comprises less than about 5 weight percent of the polysaccharide composition, the viscosity development is often not sufficient to maintain the cross-linked polysaccharide as a uniform dispersion, without continuous agitation, prior to dissolution. Preferably, the polysaccharide composition comprises from about 10 to about 20, more preferably from about 10 to about 15, weight percent of the uncross-linked polysaccharide and preferably from about 95 to about 80, more preferably from about 90 to about 85, weight percent of the cross-linked polysaccharide based on the total weight of the uncross-linked and cross-linked polysaccharide in the polysaccharide composition.

In the practice of the present invention, the polysaccharide composition is prepared by dry blending the uncross-linked and cross-linked components at desired concentrations using conventional techniques. Blending techniques, which result in the uncross-linked polysaccharide being uniformly dispersed throughout the composition, are preferred. The resulting polysaccharide composition can subsequently be dispersed and dissolved in an aqueous liquid at ambient temperatures. Preferably, the composition is dispersed at conditions such that the uncross-linked and cross-linked polysaccharide particles are essentially uniformly distributed throughout the aqueous liquid. In normal practice, the agitation is conventionally ceased after obtaining the desired dispersion. Following the dispersion of the polysaccharide composition in the aqueous liquid at ambient temperatures, the uncross-linked polysaccharide readily dissolves without the formation of soft lumps, nodules or the like. A relatively rapid increase in the viscosity of the aqueous liquid maintains a uniform dispersion until complete dissolution of the cross-linked polysaccharide occurs.

Although complete dissolution of both the uncross-linked and cross-linked polysaccharides generally occurs upon standing without subsequent agitation or treatment, the pH of the aqueous liquid is advantageously increased to assist in the dissolution of the cross-linked polysaccharide. The alkalinity of aqueous liquid most advantageously employed herein is dependent upon the specific cross-linked polysaccharide and aqueous liquid employed. In general, the alkaline, aqueous solution will advantageously have a pH from about 6.5 to about 10. Preferably, the aqueous liquid exhibits a pH value from about 7 to about 9.

To provide such alkalinity to the aqueous liquid, a basic material is often advantageously, although optionally, incorporated in the polysaccharide composition. As used herein, the term "basic material" refers generally to those materials which, when dissolved in water, impart an alkaline pH value thereto. Representative of such basic materials include the alkali metal hydroxides, carbonates, bicarbonates and phosphates; the alkaline earth metal hydroxides; various alkaline earth metal and transition metal oxides; primary, secondary and tertiary amines; borax; ammonium hydroxide and the like. Advantageously, the basic material is a normally solid material which can be dry blended with the polysaccharide composition. Preferred of such normally solid, basic materials are the alkali metal carbonates and bicarbonates, with sodium bicarbonate and sodium carbonate being preferred. Most preferred is sodium bicarbonate. Advantageously, sufficient amounts of the basic material are employed to adjust the pH of the aqueous liquid to the aforementioned pH values. The amounts of the basic material incorporated within the polysaccharide composition necessary to impart such pH values to the aqueous liquid are dependent on the specific basic material and the aqueous liquid employed. In general, the normally solid, basic material is dry blended with the polysaccharide composition in amounts such that the resulting composition will comprise from about 0.1 to about 5 weight percent of said material based on the total weight of the polysaccharide. Alternatively, the basic material can be dissolved in the aqueous liquid subsequent to the addition of the polysaccharide composition thereto.

Optionally, the polysaccharide composition can also contain various adjuncts such as fillers, lubricants, hardeners, stabilizers and the like. Adjuncts conventionally employed heretofore are well-known in the art and reference is made thereto for the purposes of this invention.

The following example is set forth to illustrate the invention and should not be construed to limit its scope. In the example, all parts and percentages are by weight unless otherwise specified.

EXAMPLE

A polysaccharide composition is prepared by dry blending 15 parts of an uncross-linked hydroxypropyl methylcellulose having a viscosity, as a 2 percent solution in water, of about 75,000 cps when measured at 20° C. using an Ubbelohde viscometer; 22 parts of a cross-linked hydroxypropyl methylcellulose having a viscosity, as a 2 percent solution in water, of about 40,000 cps when measured at 20° C. using an Ubbelohde viscometer and cross-linked using about 1.6 parts of glyoxal per 100 parts of the cellulose ether; 63 parts of a cross-linked hydroxypropyl cellulose ether having a viscosity, as a 2 percent solution in water, of about 75,000 cps at 20° C. using an Ubbelohde viscometer and prepared using about 0.6 part glyoxal per 100 parts of the cellulose ether and 1 part sodium bicarbonate. A 16 part portion of the resulting polysaccharide composition is added to 984 parts of water, with sufficient agitation to disperse the composition. After forming a uniform dispersion, which requires about 60 seconds, the agitation is discontinued. Within a period of about 60 seconds after the formation of the dispersion (i.e., 60 seconds after stopping agitation), the viscosity of the aqueous liquid is measurably increased without any evidence of soft lumps, nodules or other agglomerations. Such increased viscosity in the aqueous liquid maintains the cross-linked polysaccharide in dispersion. After an additional 15 minutes, the entire amount of polysaccharide dissolves in the aqueous liquid without any noticeable settling thereof. At this time, a homogeneous solution of the polysaccharide, having a viscosity of about 3,500 cps as measured using a Brookfield viscometer, Model RVT, No. 3 spindle at 20 rpm and 20° C., is obtained.

What is claimed is:

1. A polysaccharide composition comprising a dry blend of (a) a particulate aqueous liquid soluble, polysaccharide or polysaccharide derivative having essentially no cross-linkages which forms substantial amounts of soft lumps, nodules or other agglomerations upon addition to water at ambient conditions and (b) a particulate polysaccharide or polysaccharide derivative being sufficiently cross-linked such that the cross-linked polysaccharide or polysaccharide derivative does not form soft lumps, nodules or other agglomerations upon its addition to water; said uncross-linked polysaccharide or derivative and cross-linked polysaccharide or derivative being employed in amounts such that upon the composition's dispersion and subsequent dissolution in an aqueous solution at ambient temperature, the uncross-linked polysaccharide or derivative thereof does not form substantial amounts of soft lumps, nodulus or other agglomerations and the viscosity of the aqueous liquid is increased at a sufficient rate that the cross-linked polysaccharide is maintained in dispersion without significant amounts thereof settling prior to dissolution.

2. The polysaccharide composition of claim 1 wherein the polysaccharide or polysaccharide derivative is a cellulose ether.

3. The polysaccharide composition of claim 2 wherein the cellulose ether is in particulate form having a number average particle size from about 0.074 to about 2 mm.

4. The polysaccharide composition of claim 3 wherein the uncross-linked cellulose ether is methylcellulose, hydroxyalkyl cellulose or hydroxyalkyl methylcellulose and the cross-linked cellulose ether is methylcellulose, hydroxyalkyl cellulose or hydroxyalkyl methylcellulose cross-linked using an aldehyde.

5. The polysaccharide composition of claim 4 wherein the cross-linked cellulose ether is prepared by cross-linking the cellulose ether using from about 0.2 to about 5 weight percent of glyoxal gased on the total weight of the polysaccharide being cross-linked.

6. The polysaccharide composition of claim 3 wherein the composition further comprises a normally solid basic material.

7. The polysaccharide composition of claim 6 wherein the normally solid basic material is an alkali metal carbonate or bicarbonate.

8. A polysaccharide composition comprising a dry blend of from about 5 to about 20 weight percent of an uncross-linked polysaccharide or polysaccharide derivative and from about 80 to about 95 weight percent of a cross-linked polysaccharide or polysaccharide derivative wherein said weight percents are based on the total amount of uncross-linked and cross-linked polysaccharides in the composition.

9. The polysaccharide composition of claim 8 wherein the polysaccharides are cellulose ethers.

10. The polysaccharide composition of claim 9 wherein the uncross-linked cellulose ether is methylcellulose, hydroxyalkyl cellulose or hydroxyalkyl methylcellulose and the cross-linked cellulose ether is methylcellulose, hydroxyalkyl cellulose or hydroxyalkyl methylcellulose cross-linked using an aldehyde.

11. The polysaccharide composition of claim 10 wherein the cross-linked polysaccharide is a cross-linked hydroxypropyl methylcellulose prepared by cross-linking a hydroxypropyl methylcellulose using from about 0.2 to about 5 weight percent of an aldehyde based on the weight of the methylcellulose or derivative.

12. The polysaccharide composition of claim 11 wherein the composition further comprises an amount of a normally solid, basic material, said amount being sufficient to impart a pH of from about 7.0 to about 10 to an aqueous liquid upon addition of the polysaccharide composition thereto.

13. The polysaccharide composition of claim 12 wherein the normally solid basic material is an alkali metal carbonate or bicarbonate.

* * * * *